(12) United States Patent
Patel et al.

(10) Patent No.: US 12,461,078 B2
(45) Date of Patent: Nov. 4, 2025

(54) COMPOUNDS FOR USE IN SYSTEM SUITABILITY TESTING OF INERT LC SYSTEMS AND COLUMNS

(71) Applicant: Waters Technologies Corporation, Milford, MA (US)

(72) Inventors: Amit Patel, Shrewsbury, MA (US); Matthew A. Lauber, North Smithfield, RI (US); Kevin Wyndham, Upton, MA (US); Mathew DeLano, Needham, MA (US); Jennifer Simeone, Shrewsbury, MA (US)

(73) Assignee: Waters Technologies Corporation, Milford, MA (US)

( * ) Notice: Subject to any disclaimer, the term of this patent is extended or adjusted under 35 U.S.C. 154(b) by 157 days.

(21) Appl. No.: 17/471,463

(22) Filed: Sep. 10, 2021

(65) Prior Publication Data
US 2022/0091079 A1    Mar. 24, 2022

Related U.S. Application Data

(60) Provisional application No. 63/079,151, filed on Sep. 16, 2020, provisional application No. 63/079,160, filed on Sep. 16, 2020.

(51) Int. Cl.
*G01N 30/88* (2006.01)
*G01N 30/02* (2006.01)

(52) U.S. Cl.
CPC ....... *G01N 30/88* (2013.01); *G01N 2030/027* (2013.01)

(58) Field of Classification Search
CPC ............. G01N 30/88; G01N 2030/027; G01N 30/8658; G01N 30/52; B05D 1/60; B05D 5/00; B05D 2518/10; C07F 9/6561; C07F 9/65616
See application file for complete search history.

(56) References Cited

U.S. PATENT DOCUMENTS

| | | | |
|---|---|---|---|
| 6,703,211 B1 * | 3/2004 | Shultz | C12Q 1/6823 |
| | | | 435/8 |
| 2006/0027098 A1 | 2/2006 | Lautamo | |
| 2012/0100120 A1 * | 4/2012 | Ferrante | A23L 33/16 |
| | | | 424/94.1 |

(Continued)

FOREIGN PATENT DOCUMENTS

WO    WO-2004030621 A2 *    4/2004    ......... A61K 31/137

OTHER PUBLICATIONS

Sigma-Aldrich Adenosine 5'-triphosphate (ATP) Bioluminescent Assay Kit Product Information Sheet (Year: 2024).*

(Continued)

*Primary Examiner* — Jill A Warden
*Assistant Examiner* — Jacqueline Brazin
(74) *Attorney, Agent, or Firm* — WOMBLE BOND DICKINSON (US) LLP; Deborah M. Vernon; Ricardo Joseph

(57) ABSTRACT

The present disclosure is directed to a kit for evaluating system inertness. The kit includes a positive control comprising a metal interacting moiety, and a negative control that does not contain a metal interacting moiety. In some embodiments the kit also includes a container to hold a system suitability solution (e.g., an equimolar mixture of the positive control and the negative control).

18 Claims, 7 Drawing Sheets
Specification includes a Sequence Listing.

(56) References Cited

U.S. PATENT DOCUMENTS

2020/0215457 A1 7/2020 DeLano et al.
2020/0217827 A1 7/2020 Liu et al.

OTHER PUBLICATIONS

Sigma Aldrich Caffeine, https://www.sigmaaldrich.com/US/en/product/sial/c0750?srsltid=AfmBOopjxDTdrNSL40dMyYf4vGBUrxqsGTxV-bZZZtXUdQGJeGko6G3R Accessed Oct. 30, 2024. (Year: 2024).*
Alonso, M.T. et al. (2003). "Fura-2 antagonises calcium-induced calcium release." Cell Calcium. 33. 27-35. (Year: 2003).*
Invitation to Pay Additional Fees and, Where Applicable, Protest Fee issued in International Applications No. PCT/IB2021/058260 dated Dec. 9, 2021.
Wright et al. "New method for evaluating irreversible adsorption and stationary phase bleed in gas chromatographic capillary columns." J. Chromatogr. A. 1261(2012): 142-150.
Zenkevich et al. "Inertness Criterion for Gas-Chromatographic Systems." J. Anal. Chem. 69.12(2014): 1130-1140.

* cited by examiner

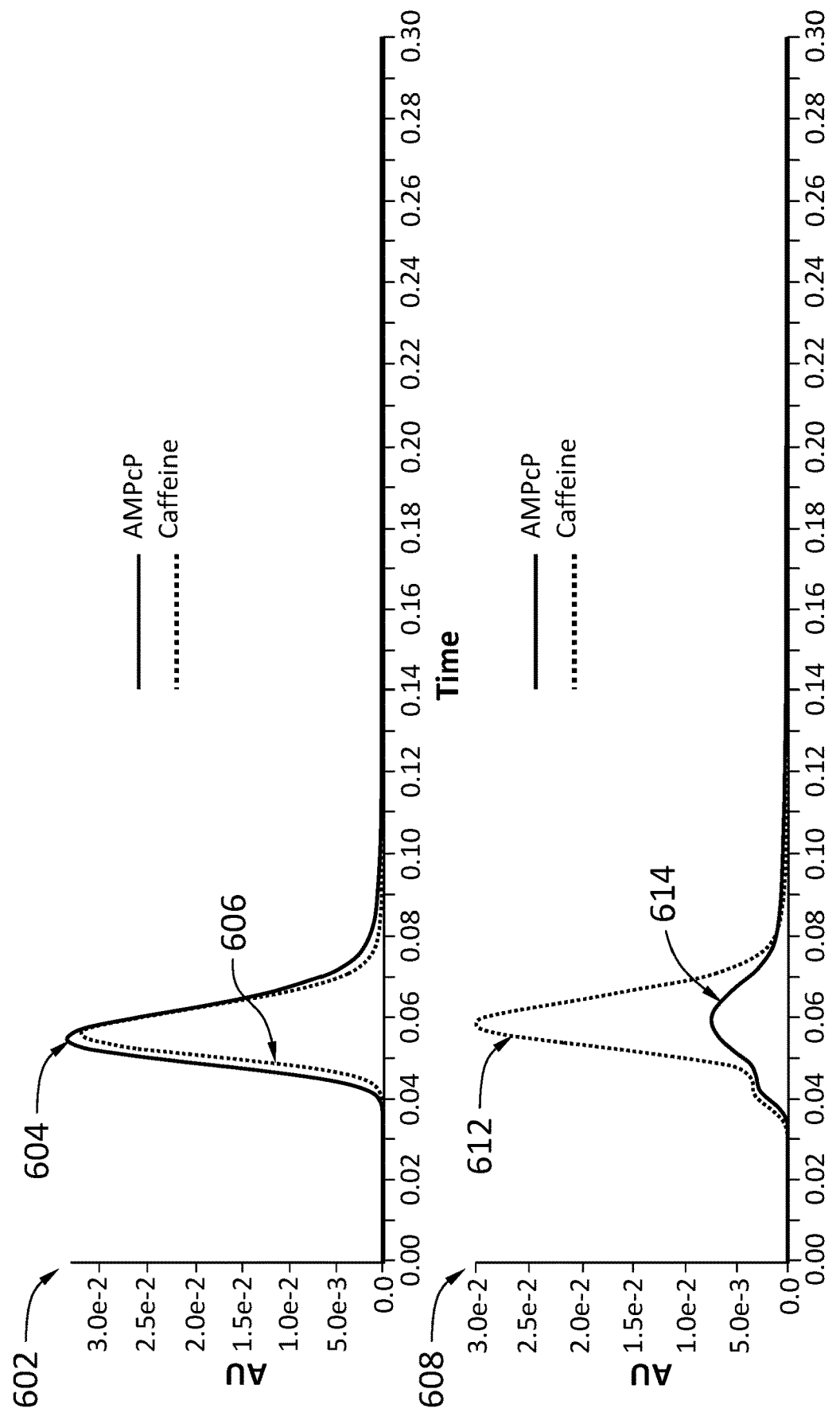

COMPOUNDS FOR USE IN SYSTEM SUITABILITY TESTING OF INERT LC SYSTEMS AND COLUMNS

CROSS-REFERENCE TO RELATED APPLICATIONS

This application claims priority and benefit to U.S. Provisional Patent Application No. 63/079,151, filed on Sep. 16, 2020, and entitled "Compounds for Use in System Suitability Testing of Inert LC Systems and Columns." This application also claims priority and benefit to U.S. Provisional Patent Application No. 63/079,160, filed on Sep. 16, 2020, and entitled "Evaluation of System Inertness". The content of both applications are incorporated herein by reference in their entirety.

SEQUENCE LISTING

The instant application contains a Sequence Listing which has been submitted electronically in ASCII format and is hereby incorporated by reference in its entirety. Said ASCII copy, created on Sep. 8, 2021, is named W-4289-US02_SL.txt and is 907 bytes in size.

FIELD OF THE TECHNOLOGY

The present disclosure relates to compounds for use in system suitability testing of inert LC systems and columns. More specifically, this technology relates to probe compounds for the detection of exposed metal in liquid chromatographs, chromatographic columns and coupled detectors.

BACKGROUND

Liquid chromatography (LC) is an analytical separation technique, which enables the separation of a mixture of chemical species on the basis of differential interactions between the compounds of the mixture and a stationary phase—defined as primary interactions, which are the anticipated interactions between the mixture, the designed stationary phase and the modulations from specifically chosen mobile phase/environmental conditions. These interactions are dependent on a number of controlled variables, such as mobile phase composition, temperature and flow rate. Because the analytical figures of merit of a given separation are dependent on a large number of variables, which directly impact the extent and degree of the primary chemical interactions, care is taken to operate at a consistent set point—through careful preparation of mobile phases, proper thermostatic control of equipment and use of reproducibly manufactured chromatographic columns.

SUMMARY

The extent to which probe compounds interact with exposed metal in chromatographic systems and columns can be used to design and execute suitability experiments which yield helpful information. One of the techniques for assessing the suitability of inert LC systems and columns uses probe compounds as positive and negative controls. Compounds can be selected that would be appropriate as a pair to function as positive and negative controls. One example of the positive and negative controls is Adenosine-5'-Triphosphate (ATP) and Adenosine. Chemically modified analogs of Adenosine and ATP as well as other nucleotides can also be used in order to accommodate alternate detection modalities—such as fluorescence detection. One set of analogs of ATP and an associated non-interacting negative control are 2'(3')-O-(4-Benzoylbenzoyl)adenosine 5'-triphosphate (Bz-ATP) and benzophenone, respectively. Also, non-hydrolyzable nucleotide analogs are of interest, as it is well known that native pyrophosphate bonds are prone to hydrolysis. Other chemical moieties can be used for system suitability standards.

Confirming instrument performance is a critical aspect of any analytical measurement. When analyzing compounds that are prone to metal adsorption, there is more to confirm than just mechanical instrument performance. It is also important to verify inertness of the chosen LC. The present disclosure presents a novel approach to assess the inertness of chromatographic systems.

Considerations around the stability of standards led to the use of a nucleotide analog called AMPcP, that unlike ATP and ADP does not contain a pyrophosphate bond such that it is hydrolytically stable. Using flow injection analyses of AMPcP, it was possible to observe higher and more consistent recoveries from an inert LC system versus a metal alloy-based instrument.

The ability to pair AMPcP with caffeine as a negative control was also demonstrated, where the use of AMPcP successfully identified the presence of metal while the caffeine helped verify overall mechanical performance.

In one aspect, the present disclosure includes a kit for evaluating system inertness. The kit includes a positive control comprising a nucleotide diphosphate with a non-hydrolyzable alpha-beta bond or a chemically modified analog thereof, wherein the positive control contains a metal interacting moiety, and a negative control that does not contain a metal interacting moiety. In some embodiments the kit further includes a container to form a solution (e.g., a system suitability solution) of a mixture of the negative control and the positive control. In some embodiments, the nucleotide diphosphate with a non-hydrolyzable alpha-beta bond is adenosine 5'-($\alpha$, $\beta$-methylene)diphosphate (AMPcP). In some embodiments, the solution of the mixture of the negative control and the positive control are an equimolar mixture. In some embodiments, the negative control and the positive control share a chromophore, share a wavelength of maximum UV absorbance, and exhibit identical extinction coefficients at said wavelength. In some embodiments, the negative control consists of adenosine or substantially adenosine (e.g., a diluted solution of adenosine in water or water/polar solvent mixture). In some embodiments, the negative control consists of caffeine or substantially caffeine (e.g., a diluted solution of caffeine in water or water/polar solvent mixture).

In another aspect, the present disclosure includes a kit for evaluating system inertness. The kit includes a solution with a positive control comprising adenosine-5'-triphosphate (ATP) or a chemically modified analog thereof, and a negative control that does not contain a metal interacting moiety; and a container to hold the solution. In some embodiments, the negative control and the positive control share a chromophore, share a wavelength of maximum UV absorbance, and exhibit identical extinction coefficients at said wavelength. In some embodiments, the solution of the negative control and the positive control are an equimolar mixture. In some embodiments, the chemically modified analog of adenosine-5'-triphosphate (ATP) is a 2'(3')-O-(4-Benzoylbenzoyl)adenosine 5'-triphosphate (Bz-ATP) compound. In some embodiments, the negative control consists of adenosine or substantially adenosine. In some embodiments, the negative control consists of caffeine or substantially caffeine.

In another aspect, the present disclosure includes a kit for evaluating system inertness. The kit includes a positive control comprising a metal interacting moiety; a negative control that does not contain a metal interacting moiety; and a container to hold a system suitability solution. In some embodiments, the negative control and the positive control share a chromophore, share a wavelength of maximum UV absorbance, and exhibit substantially identical extinction coefficients at said wavelength. In some embodiments, the negative control and the positive control are chemical compounds, and wherein the difference between the negative control and positive control is a series of three phosphate groups. In some embodiments, the positive control is adenosine-5'-triphosphate (ATP) or a chemical analog thereof and the negative control is adenosine or caffeine. In some embodiments, the positive control is adenosine 5'-(α, β-methylene)diphosphate (AMPcP) or a chemical analog thereof and the negative control is adenosine or caffeine. In some embodiments, the positive control is a nucleotide diphosphate with a non-hydrolyzable alpha-beta bond. In some embodiments, the negative control consists of adenosine or substantially adenosine. In some embodiments, the negative control consists of caffeine or substantially caffeine. In some embodiments, the negative control and the positive control have different spectral properties. In some embodiments, the solution of the negative control and the positive control are an equimolar mixture. In some embodiments, the positive control is etheno adenosine 5'-(α, β-methylene)diphosphate with the following structure:

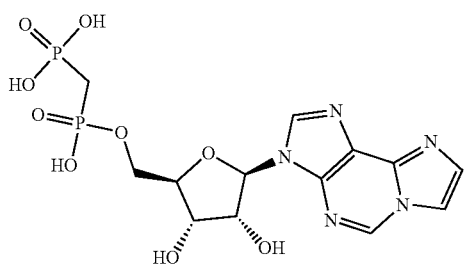

In one aspect, the present disclosure includes a kit for evaluating system inertness. The kit includes a solution having a container of positive control comprising a metal interacting moiety, wherein the positive control is etheno adenosine 5'-(α, β-methylene)diphosphate with the following structure:

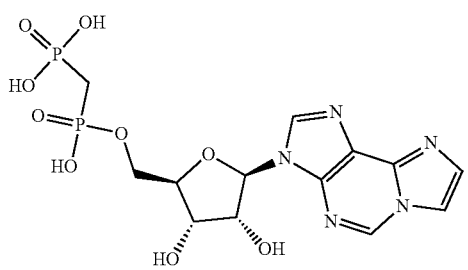

Embodiments of this aspect of the invention can further include one or more of the following features. The kit can also include a syringe for injecting the positive control into at least a portion of a liquid analytical system (e.g., into the fluidic handling system of a LC system with the column removed; into a LC column, into a LC system with a column in place, etc.). Some embodiments of the kit further include a container of a negative control that does not contain a metal interacting moiety (e.g., adenosine, caffeine, etc.)

The above aspects and features of the present disclosure are combinable and provide numerous advantages over the existing technology. In some embodiments, there are numerous benefits for using the compounds of the present disclosure in system suitability testing of inert LC systems and columns. For example, the present disclosure uses probe compounds for the detection of exposed metal in liquid chromatographs, chromatographic columns and coupled detectors. These compounds (e.g., suitability samples) can help an analyst determine the suitability of a system for a particular application prior to (and without) expending resources (e.g., time and money) on separations that will not provide meaningful results. That is, by determining the suitability of the inertness of the system prior to a desired separation or application the analyst will know not to waste resources on a separation/application destined to fail. This information can prevent wasted resources of time and expense as knowledge of the suitability of the system for a particular application will eliminate or greatly reduce experiments destined to give poor quality results.

BRIEF DESCRIPTION OF THE DRAWINGS

The technology will be more fully understood from the following detailed description taken in conjunction with the accompanying drawings, in which:

FIG. 6 displays how replicate injections of AMPcP and caffeine with a UHPLC partially configured with hybrid surface technology (HST) (versus fully configured) readily identified exposed metal surfaces through increased peak area relative standard deviation as well as a reduction in absolute recovery.

DETAILED DESCRIPTION

Figure 1:
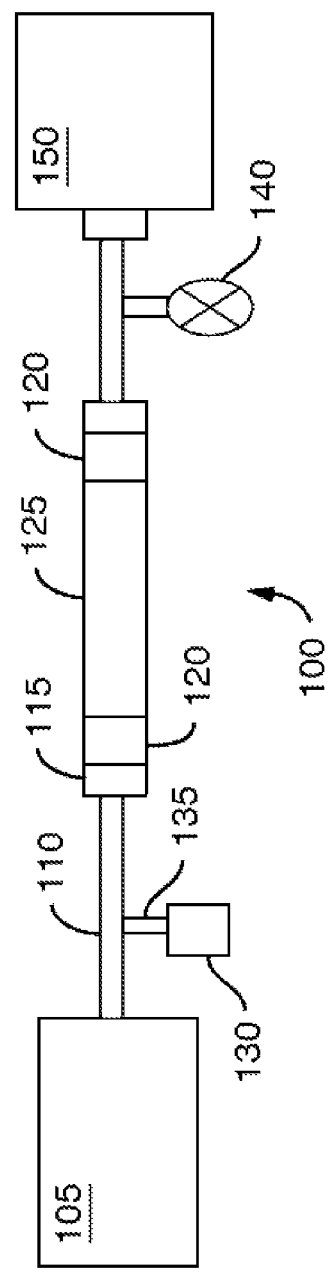
FIG. 1 is a schematic of a chromatographic system including a chromatography column and various other components, in accordance with an illustrative embodiment of the present disclosure.

In general, the present disclosure is directed to inert LC system characterization approaches for evaluating proper function of inert surfaces, particularly when analyzing compounds known to exhibit a high degree of metal interactions. Compounds can be selected that would be appropriate as a pair to function as positive and negative controls. The extent to which probe compounds interact with exposed metal in chromatographic systems and columns can be used to design and execute suitability experiments which yield helpful information.

One approach to system suitability testing involves preparation of a mixture that contains analytes of interest or surrogate reagent molecules that exhibit shared chemical properties. If methods are published within the various global pharmacopeias, standards may be commercially available, otherwise scientists will have to manually identify and prepare a suitable standard for testing. The known test mixture is injected prior to sample analysis to confirm system suitability. Referencing these measurements against anticipated or historical results can confirm proper system performance and be used to monitor method performance over time.

The evaluation of system readiness for the analysis of compounds that adsorb to metal surfaces can be relatively complicated. Use of suitability standards that do not contain metal sensitive compounds can, in some instances, provide little help in detecting exposed metal surfaces. One option to address these concerns is the use of a metal-sensitive probe compound to check an instrument's flowpath along with the flowpath of any detector(s). Herein, a hydrolytically stable nucleotide analog, AMPcP, is proposed for system readiness measurements. This molecule is demonstrated to be as effective as adenosine triphosphate in binding to metals, yet to not be susceptible to degradation during storage and long-term use. One of the technique involves a methods utilizing this metal adsorbing compound are applied along with non-adsorbing caffeine standards in simple to implement flow injection tests. These approaches are shown to be effective in detecting metals and quickly investigating the inertness of LC equipment.

One of the techniques for assessing the suitability of inert LC systems via positive and negative controls uses adenosine-5'-triphosphate (ATP) and adenosine. Chemically modified analogs of adenosine and ATP as well as other nucleotides can also be used in order to accommodate alternate detection modalities—such as fluorescence detection. One set of analogs of ATP and an associated non-interacting negative control are 2'(3')-O-(4-Benzoylbenzoyl)adenosine 5'-triphosphate (Bz-ATP) and benzophenone.

Another set of molecules which can be used to serve a similar purpose as Bz-ATP include, but are not limited to, ethenoadenosine, 6-aminohexyladenosine, and aminopurine as well as nucleotides, nucleosides or nucleobases labeled with MANT (methyl-anthraniloyl), TNP (trinitrophenyl), fluorescein, pyrene, 7-Propargylamino-7-deaza, DY-647P1, as well as fluorescent nucleobases and nucleotides.

Non-hydrolyzable nucleotide analogs are also of interest, because native pyrophosphate bonds can be prone to hydrolysis. Some example nucleotides with non-hydrolyzable bonds include, ATPαS, ApCpp, AppCp, AppNHp, and ATPγS. Other equivalents include, but are not limited to, those based on guanine, cytosine, uridine, and thymine. Nucleotide diphosphates with a non-hydrolyzable alpha-beta bond can be used for certain applications due to their improved stability properties.

Some other chemical moieties to consider for system suitability standards include probes based on or similar to 2-pyridinol-1-oxide, tetracycline, fructose-1,6-bisphosphate, pyranine, deferiprone, deferasirox, a bisphosphonate containing molecule, tiludronic acid, risedronic acid, diphenylglyoxime, alpha-benzoin oxime or salicylaldoxime. Molecules based on a tricarboxylic acid moiety can also be used.

Testing with the compounds can be completed to test the health of the system, including as a maintenance step. Specific times for testing the LC system may be scheduled, e.g., after a set amount of time, a set number of uses, or after a specific compound is used. Only a portion of the LC system may need to be tested at a given time. For example, evaluating only a portion of the system may be useful for troubleshooting the system.

What is being tested may also be varied. Evaluation tests which measure multiple performance characteristics at once are desirable. This is achieved by employing various chromatographic approaches using a cocktail of chemical compounds. For example, a single experiment may use several compounds and combine chromatographic approaches to simultaneously evaluate gradient delivery and exposed metal surfaces.

Figures of merit of a LC separation are dependent on a number of difficult to control variables, where "secondary interactions" are a common source of reduced performance. One example is poorly controlled metal content found in stationary phase silica particles. The uncontrolled presence of the metals in the particles results in variable secondary interactions, which can reduce the quality and reproducibility of analytical separations. Additional sources of secondary interactions include various metallic components in chromatographic columns and LC flow path components (e.g., column tube, frits, injector needle, and tubing). In order to attenuate the undesired interactions involving the surfaces of the system (e.g., the surfaces of LC flow path components), analysts have relied heavily on passivating or conditioning hardware surfaces and even making alterations to analytical methods through the use of ion pairing agents, chemical derivatization, and chelators as mobile phase additives, among others.

Another approach presented for addressing the deleterious effects of secondary interactions involves the use of LC components, which prevent contact of the analytes with metal surfaces. These technologies include PEEK or other non-metal components, PEEK-lined steel components and metal components, which have been chemically modified or coated at the surface. An example of a coated is one using surface technology based on vapor deposited organosilica and carboxysilane compositions. A patent application published by Lauber et al. (US 20190086371A) describes this emerging technology in greater detail. LC systems based on such technologies are generally described as inert LCs. US 20190086371 is hereby incorporated by reference in its entirety.

A further approach is to passivate the system with a liquid solvent, such as nitric acid. The solvent approach provides temporary passivation—that is, provides temporary inertness (or inert coating) to the system.

There are a number of approaches which can be employed individually or in combination to address the presence of secondary interactions and their impact on the quality of a given chromatographic separation. There exists a need for compounds that can help evaluate whether the coatings/passivation methods are providing an inert system for the processed samples. consequently, compounds that can be used alone or in combination with other compounds are needed to evaluate system suitability testing of inert LC systems and columns. The system/device and coating to render the system/device inert will be first discussed in relation to FIG. 1.

FIG. 1 is a representative schematic of a chromatographic system/device 100 that can be used to separate analytes, such as peptide compounds, in a sample. System 100 includes several components including a fluid manager system 105 (e.g., controls mobile phase flow through the system), tubing 110 (which could also be replaced or used together with micro fabricated fluid conduits), fluid connectors 115, frits 120, a chromatography column 125, a sample injector 135 including a needle (not shown) to insert or inject the sample into the mobile phase, a vial, or sample container 130 for holding the sample prior to injection, and a detector 150, such as a mass spectrometer. The chromatography column 125 can be a reversed phase column. Interior surfaces of the components of the chromatographic system/device 100 form a fluidic flow path that has wetted surfaces. Components of the fluidic flow path can have a length to diameter ratio of at least 20, at least 25, at least 30, at least 35 or at least 40. The fluidic flow path can include wetted surfaces of an electrospray needle (not shown).

At least a portion of the wetted surfaces can have a coating such as an alkylsilyl coating. The coating can tailor the hydrophobicity of the wetted surfaces. The coating can be applied by vapor deposition. As such, methods and devices of the present disclosure can include high pressure resistant materials (e.g., stainless steel) of a flow system, and the wetted surfaces of the fluidic flow path providing the appropriate hydrophobicity so deleterious interactions or undesirable chemical effects on the sample can be minimized.

In some examples, the coating of the flow path is non-binding with respect to the analyte, such as a metal-sensitive compound (e.g., a peptide). Consequently, the analyte, such as peptide compounds, does not bind to the coating of the flow path.

The coating can be provided throughout the system from the tubing or fluid conduits 110 extending from the fluid manager system 105 all the way through to the detector 150. The coatings can also be applied to portions of the components of the fluidic path. That is, one may choose to coat one or more components or portions of a component and not the entire fluidic path. For example, the internal portions of the column 125 and its frits 120 and fluid connectors 115 can be coated whereas the remainder of the flow path can be left unmodified. Further, removable/replaceable components can be coated. For example, the vial 130 containing the sample can be coated as well as frits 120.

In some examples, system 100 will need to be cleaned/cleared before evaluation begins in order to establish a baseline before beginning tests to determine suitability. Ensuring system 100 is at a baseline can help certify that there are no contaminants. It can also be used to validate a preparation process for system 100 after manufacturing of system 100 is complete. For example, after system 100 is manufactured, method 400 of FIG. 4 can be used.

The flow path of the fluidic systems can be defined at least in part by an interior surface of tubing. The flow path of the fluidic systems can also be described at least in part by an interior surface of microfabricated fluid conduits. And the flow path of the fluidic systems can be described as at least in part by an interior surface of a column or at least in part by passageways through a frit. The flow path of the fluidic systems is also described at least in part by an interior surface of a sample injection needle or extending from the interior surface of a sample injection needle throughout the interior surface of a column. In addition, the flow path can be described as extending from a sample container (e.g., a vial) disposed upstream of and in fluidic communication with the interior surface of a sample injection needle throughout the fluidic system to a connector/port to a detector.

In some embodiments, only the wetted surfaces of the chromatographic column and the components located upstream of the chromatographic column are coated, e.g., with an alkylsilyl coating, while wetted surfaces located downstream of the column are not coated. The coating can be applied to the wetted surfaces via vapor deposition. Similarly, the "wetted surfaces" of labware or other fluid processing devices may benefit from alkylsilyl coatings. The "wetted surfaces" of these devices not only include the fluidic flow path, but also elements that reside within the fluidic flow path. For example, frits and/or membranes within a solid phase extraction device come in contact with fluidic samples. As a result, not only the internal walls within a solid phase extraction device, but also any frits/membranes are included within the scope of "wetted surfaces." The term "wetted surfaces" refers to all surfaces within a device (e.g., chromatography column, chromatography injection system, chromatography fluid handling system, labware, solid phase extraction device, pipette tips, centrifuge tubes, beakers, dialysis chambers, etc.) that come into contact with a fluid, especially a fluid containing an analyte of interest.

In embodiments which feature an inert coating along or on wetted surfaces, at least a portion of the wetted surfaces are coated with an alkylsilyl coating. The alkylsilyl coating is inert to at least one of the analytes in the sample.

In some embodiments, the alkylsilyl coating is an organosilica coating. In certain embodiments, the alkylsilyl coating is a hybrid inorganic/organic material that forms the wetted surface or that coats the wetted surfaces.

The coating, e.g., the alkylsilyl coating, can have a contact angle with water of at least about 15°. In some embodiments, the coating can have a contact angle of less than or equal to 30°. The contact angle can be less than or equal to about 115°. In some embodiments, the contact angle of the coating is between about 15° to about 90°, in some embodiments about 15° to about 105°, and in some embodiments about 15° to about 115°. For example, the contact angle of the coating can be about 0°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, or 115°.

The thickness of the coating, e.g., the alkylsilyl coating, can be at least about 100 Å. For example, the thickness can be between about 100 Å to about 1600 Å. The thickness of the coating can be about 100 Å, 200 Å, 300 Å, 400 Å, 500 Å, 600 Å, 700 Å, 800 Å, 900 Å, 1000 Å, 1100 Å, 1200 Å, 1300 Å, 1400 Å, 1500 Å or 1600 Å. The thickness of the coating (e.g., a vapor deposited alkylsilyl coating) can be detected optically by the naked eye. For example, more opaqueness and coloration is indicative of a thicker coating. From thin to thick, the color changes from yellow, to violet, to blue, to slightly greenish and then back to yellow when coated parts are observed under full-spectrum light, such as sunlight. For example, when the alkylsilyl coating is 300 Å thick, the coating can appear yellow and reflect light with a peak wavelength between 560 and 590 nm. When the alkylsilyl coating is 600 Å thick, the coating can appear violet and reflect light with a peak wavelength between 400 and 450 nm. When the alkylsilyl coating is 1000 Å thick, the coating can appear blue and reflect light with a peak wavelength between 450 and 490 nm. See, e.g., Faucheu et al., *Relating Gloss Loss to Topographical Features of a PVDF Coating*, Published Oct. 6, 2004; Bohlin, Erik, *Surface and Porous Structure of Pigment Coatings, Interactions with flexographic ink and effects of print quality*, Dissertation, Karlstad University Studies, 2013:49.

The coating can be the product of vapor deposited bis(trichlorosilyl)ethane, bis(trimethoxysilyl)ethane, bis(trichlorosilyl)octane, bis(trimethoxysilyl)octane, bis(trimethoxysilyl)hexane, or bis(trichlorosilyl)hexane. The coating can include siloxane moieties imparted by the vapor deposited reagents.

In some aspects, at least a portion of the wetted surfaces are coated with multiple layers of the same or different alkylsilane, where the thickness of the alkylsilyl coatings correlate with the number of layering steps performed (e.g., the number of deposited layers of alkylsilyl coating on wetted surfaces).

The chromatographic device can have multiple alkylsilyl coatings. For example, a second alkylsilyl coating can be in direct contact with a first alkylsilyl coating.

In one aspect, the coating is n-decyltrichlorosilane, (3-glycidyloxypropyl)trimethoxysilane (GPTMS), (3-glycidyloxypropyl)trimethoxysilane (GPTMS) followed by hydrolysis, 2-(3,4-epoxycyclohexyl)ethyltrimethoxysilane, trimethylchlorosilane, trimethyldimethyaminosilane, methoxy-polyethyleneoxy(3)silane propyltrichlorosilane, propyltrimethoxysilane, (heptadecafluoro-1,1,2,2-tetrahydrodecyl)tris(dimethylamino)silane, (heptadecafluoro-1,1,2,2-tetrahydrodecyl)trischlorosilane, (heptadecafluoro-1,1,2,2-tetrahydrodecyl)trimethoxysilane vinyltrichlorosilane, vinyltrimethoxysilane, allyltrichlorosilane, 2-[methoxy(polyethyleneoxy)3propyl]trichlorosilane, 2-[methoxy(polyethyleneoxy)3propyl]trimethoxysilane, or 2-[methoxy(polyethyleneoxy)3propyl]tris(dimethylamino)silane.

The flow path components can be made of stainless steel, including but not limited to tubing, microfabricated fluid conduits, column fits, column inlet tubing, and sample injection needles, are coated via vapor deposition with one or more of the disclosed alkylsilyls. In one aspect, these coated components are annealed to alter their chemical or physical properties.

The flow path components that are made of other materials than stainless steel or other metallics, (e.g., polymers, glass, etc.) are coated via vapor deposition with one or more of the disclosed coatings. In particular, sample vials connectable to the injection needle may be coated.

Wetted surfaces of labware or at least some portion of wetted surfaces of labware can be coated via vapor deposition with one or more of the disclosed alkylsilyl coatings. In some examples, vapor deposited coatings can minimize adsorptive losses of the sample. The vapor deposited coating can be both neutral (low in ionic properties) and hydrophilic (exhibiting a contact angle with water less than 60°). The coating can be used to mitigate issues with many different types of materials, including glass and polymeric compositions, such as polypropylene or polyethylene.

Alternatively, commercially available vapor deposition coatings can be used in the disclosed systems, devices, and methods, including but not limited to Dursan® and Dursox® (both commercially available from SilcoTek Corporation, Bellefonte, Pa.). The process for making is described in U.S. application Ser. No. 14/680,669, filed on Apr. 7, 2015, and entitled "Thermal Chemical Vapor Deposition Coated Article and Process," which claims priority to and benefit of U.S. Provisional Application No. 61/976,789 filed Apr. 8, 2014. The contents of each application are incorporated herein by reference in their entirety.

In one aspect, the alkylsilyl coatings enhance the corrosion performance of metals, e.g., as in metallic chromatography columns. Depending on the density and thickness, the coatings act as a barrier, thereby preventing water and corrosive molecules from reacting with the base metal. Increasing the hydrophobicity and density improves the corrosion performance.

In some embodiments, the alkylsilyl coating is modified with a silanizing reagent to obtain desired surface properties. The silanizing reagent can be a non-volatile zwitterion. The non-volatile zwitterion can be sulfobetaine or carboxybetaine. In some embodiments, the silanizing reagent is an acidic or basic silane. The silanizing reagent can introduce polyethylene oxide moieties.

Other components of the LC system can also include the coatings described herein, for example, the tubing, frits, and/or connectors. LC systems that include multiple coated components to minimize or eliminate the presence of metals along wetted surfaces within the fluidic flow path can be used for separating metal sensitive analytes, for example, biomolecules, proteins, glycans, peptides, oligonucleotides, pesticides, bisphosphonic acids, anionic metabolites, and zwitterions like amino acids and neurotransmitters.

The coating provides one method of how to render a system, such as a LC system and column, suitable for use. Another possible alternative to coating may be to passivate the system using liquid solvents, such as, for example, nitric acid. A system might also be rendered inert from the use of non-metallic surfaces, including polyether ether ketone, or diamond like carbon. A coating can also be a surface or composition deposited by charge vapor deposition or atomic layer deposition. After rendering the system inert, the system then needs to be tested to determine whether the system is suitable or not. Compounds, according to the present technology, are used to test whether the system is suitable or not. Techniques for using the compounds to determine system suitability, such as inert LC systems and columns, are described herein.

One of the techniques for assessing the suitability of inert LC systems coupled to optical or MS detectors involves the chromatographic separation and detection of an equimolar solution of adenosine-5'-triphosphate (ATP) and adenosine. These two compounds share a chromophore and consequently share a wavelength of maximum UV absorbance, 259 nm, as well as exhibit identical extinction coefficients at said wavelength, $E=15400$ at pH 7.0. The difference between the two compounds is a series of three phosphate groups, known to interact with metals. Because ATP contains a metal interacting moiety and adenosine does not, adenosine acts as a structurally similar negative control compound. Furthermore, the substantial difference in the hydrophobicity of the positive and negative control compounds, such as ATP and Adenosine (Log P −5.5 versus −1.05), ensures their resolution in reversed phase chromatographic separations. Two compounds having Log P values differing by greater than one are desirable. Adenosine 5'-(α, β-methylene)diphosphate (AMPcP) is another pairing for adenosine (Log P −4.8 versus −1.05, respectively).

Chemically modified analogs of Adenosine and ATP as well as other nucleotides can also be used in order to accommodate alternate detection modalities—such as fluorescence detection. One set of analogs of ATP and an associated non-interacting negative control are 2'(3')-O-(4-Benzoylbenzoyl)adenosine 5'-triphosphate (Bz-ATP) and benzophenone. As a consequence of the benzoylbenzoyl O-linked onto the ATP compound, an increased degree of reversed phase retention can be expected to advantageously facilitate a separation-based approach for system suitability. Additionally, Bz-ATP is expected to give increased UV absorbance as a consequence of the benzoylbenzoyl functional group. It is also the case that Bz-ATP can be readily measured in both positive and negative mode for LC-MS, whereas ATP is readily observed only in negative mode.

Beyond the above described benefits, the chromatographic analysis of Bz-ATP and benzophenone in an equimolar mixture enables the evaluation of inert flow paths/columns when fluorescence detection is optionally employed. An additional benefit of this fluorescent analog approach towards evaluating LC inertness is the ability to operate at substantially reduced molar loads, where secondary interactions are more easily uncovered, with the challenges associated with LC-MS signal intensity variability.

Another set of molecules which can be used to serve the same purpose as Bz-ATP include, but are not limited to, ethenoadenosine, 6-aminohexyladenosine, and aminopurine as well as nucleotides, nucleosides or nucleobases labeled with MANT (methyl-anthraniloyl), TNP (trinitrophenyl), fluorescein, pyrene, 7-Propargylamino-7-deaza, and DY-647P1, as well as fluorescent nucleobases and nucleotides (such as the fluorescent nucleobases and nucleotides described in Nature Chemistry, Volume 9, Pages 1043-1055 (2017)).

Non-hydrolyzable nucleotide analogs are also of interest, due to native pyrophosphate bonds being prone to hydrolysis. Nucleotide based standards can thus be challenging to manufacture, stabilize for storage, and to ship globally without degradation. Some example nucleotides with non-hydrolyzable bonds include, ATPαS, ApCpp, AppCp, AppNHp, and ATPγS. Other equivalents include, but are not limited to, those based on guanine, cytosine, uridine, and thymine. Nucleotide diphosphates with a non-hydrolyzable alpha-beta bond can be advantageous for certain applications due to their improved stability properties, such as the example depicted in Structure 1, Adenosine 5'-(α, β-methylene)diphosphate (AMPcP). These too can be labeled with additional substituents or built from alternative nucleobase like structures to better facilitate detection, whether it be UV, MS or fluorescence.

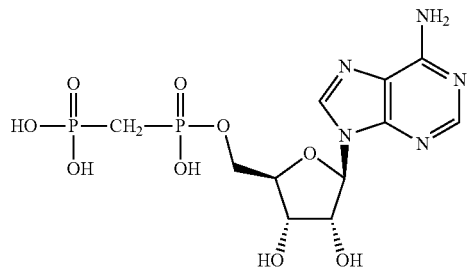 [SMILES: Nc1ncnc2c1ncn2[C@@H]1O[C@H](COP(=O)(O)CP(=O)(O)O)[C@@H](O)[C@H]1O]

Structure 1. Adenosine 5'-(α, β-Methylene)Diphosphate

Structure 2 is an example of such a variant is shown with etheno-AMPcP, where the addition of an etheno substituent, coupled onto the nucleobase portion of the molecule via ring closure, grants increased hydrophobicity, enables positive mode MS detection as well as fluorescence detection and provides a more sensitive UV handle for UV spectrophotometric measurements. An additional benefit to fit-for-function chemical modification of test probes is the ability to modulate a molecule's ability to chelate metals. The adjustment of the strength of these interactions enables the development and application of test probes (negative and positive controls). The test probes interact sufficiently strong to detect secondary interactions in chromatographic instruments and columns, but not so strongly that no signal is observed (e.g., complete adsorption of the test probe). This grants an additional degree of flexibility in the design of system suitability, which is helpful as the detectors generally employed alongside liquid chromatography span many orders of magnitude with regard to detection dynamic range.

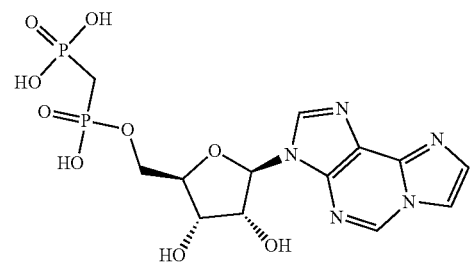

Structure 2. Etheno Adenosine 5'-(α, β-Methylene)Diphosphate

Some other chemical moieties to consider for system suitability standards include probes based on or similar to 2-pyridinol-1-oxide, tetracycline, fructose-1,6-bisphosphate, pyranine, deferiprone, deferasirox, a bisphosphonate containing molecule, tiludronic acid, risedronic acid, diphenylglyoxime, alpha-benzoin oxime or salicylaldoxime. Molecules based on a tricarboxylic acid moiety can also be used.

A biomolecular scaffold can also be used to prepare standards for system suitability testing. A synthetic polypeptide is one such scaffold. A peptide can be chemically synthesized to contain one or more phosphorylated residues, such as phosphoserine, phosphothreonine, or phosphotyrosine. In some examples, O-phosphorylated residues are more stable and more resistant to hydrolysis than N-phosphorylated residues like phosphorylated histidine. Optionally, the peptide can be synthesized to contain one or more fluorescent amino acid residues, including but not limited to tryptophan. In one example, a metal sensitive probe is used that is based on a sequence of H2N-GEGWG(pT)G(pT)GK-OH (SEQ ID NO: 1), and the chromatographic behavior can be compared to that of H2N-GEGWGTGTGK-OH (SEQ ID NO: 2). Standards based on chemically synthesized oligonucleotides can also show utility. Onto these biomolecular scaffolds, additional substituents can be added to advantageously alter chromatographic effects and detectability.

The present disclosure includes methods of testing LC systems for metal interactions using system suitability standards, such as adenosine 5'-(α, β-methylene)diphosphate (AMPcP), or adenosine triphosphate (ATP). These standards interact with metal (i.e., metal interacting moiety), which will absorb to exposed metal components. As a result, measurement of a decreased amount of standard from the injected amount indicates the presence of exposed metal and the possibility of system unsuitability.

The nucleotide analog of AMPcP has been confirmed to have as much propensity to adsorb to a titanium frit as adenosine triphosphate (ATP), yet be resistant to hydrolysis and be stable for long-term storage and repeat use (as is befitting of any reagent proposed for system suitability testing).

AMPcP can be used in a flow injection test (no column in-line) to monitor for losses and peak shape perturbations that can potentially be present in any chromatograph manufactured with one or more metal based components. In this approach, sequential injections of AMPcP are made without a column and various peak attributes are monitored and ultimately correlated to the amount of metal in the flowpath. The ability of this method to discriminate between inert chromatographic surfaces versus metal is verified by comparing peak areas, peak shapes and injection repeatability for AMPcP using an ultra-high-performance liquid chromatography (UHPLC) equipped with traditional MP35N metal alloy components versus an equivalent UHPLC equipped with an ethylene bridged hybrid organic-inorganic surface.

The present disclosure shows how AMPcP can be used to identify varying degrees of exposed metal within the flow path of the LC instrument itself. When metal sensitive compounds, such as AMPcP, are injected onto a metal-based flowpath, it is common to see poor reproducibility across multiple injections, specifically variation in peak area and peak height, as well as an overall decreased analyte signal. Systems with exposed metal surfaces can also show increasing peak areas during repeated injections, as a result of analytes adsorbing to and thus passivating the exposed metal. This adsorption process can lead to greater recoveries in subsequent injections, but this is not always a predictable phenomenon and the passivation state is reversible. Without wishing to be bound by theory, peak area and peak area variability detected after applied flow injections of AMPcP are believed to be diagnostic of the presence of metal surfaces. Peak area and peak area variability can be used alone or in combination with analyte recovery or absolute analyte response to assess system suitability. The extent of the variability might be dependent on several factors, such as the specific compound being analyzed, the system history, and the mobile phase. To ensure removal of any previously injected sample, a flush step using multiple injections of 0.3% ammonia solution can be employed. The flush can be an effective method for removing components and past analyte sample from any metal in the flowpath.

In some examples, because metal interactions can be significantly impacted by pH, the test procedure of the present disclosure uses a neutral pH and no buffer. The use of neutral pH and no buffer can be used to ensure a large magnitude of effect, because at neutral pH the AMPcP will have a negative charge, while the metal surfaces of the flow path will have a positive charge.

Additionally, AMPcP sensitivity to exposed metal surfaces can be more pronounced at increased organic compositions, likely as a consequence of affecting the dielectric constant of the mobile phase. The system set-up of the present disclosure can include the use of a zero dead volume titanium union in place of a column, and flow conditions of 0.5 mL/min of 80:20 acetonitrile:water.

Figure 2:
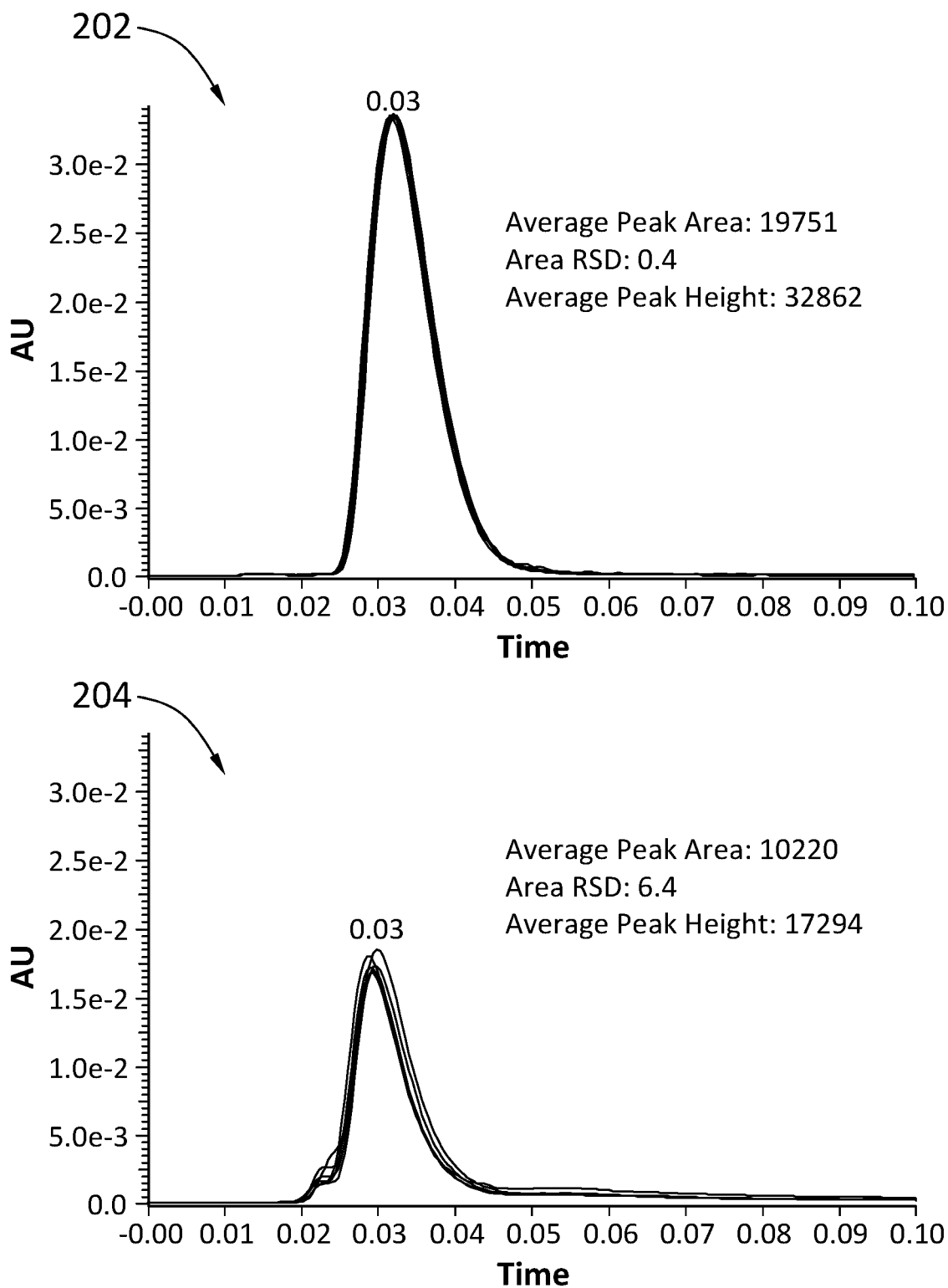
FIG. 2 is a representative example displaying sensitivity and repeatability of AMPcP applied to detecting metal in a chromatographic flowpath, in accordance with an illustrative embodiment of the present disclosure.

FIG. 2 displays replicate injections of AMPcP on an LC with ethylene bridged hybrid surfaces versus a chromatograph with a biocompatible MP35N flowpath (i.e., flowpath with exposed metal surfaces). That is, FIG. 2 is a representative example displaying sensitivity and repeatability of AMPcP applied to detecting metal in a chromatographic flowpath. FIG. 2 is an overlay of 6 replicate 1 mL injections of AMPcP on an LC equipped with ethylene bridged hybrid chromatographic surfaces (top figure, 202) versus an equivalent LC configuration equipped with metallic MP35N components (bottom figure, 204) as acquired using a flow rate of 0.5 mL/min of 80:20 acetonitrile:water.

For FIG. 2, there was a substantially lower average peak area (48%) and average peak height (47%) when AMPcP was injected onto the metallic MP35N flowpath. Additionally, the peak area RSD for the metal-based biocompatible system was 6.4%, whereas the peak area RSD was 0.4% for the LC equipped with ethylene bridged hybrid (HST) surface technology. This improved peak area reproducibility and the overall increased analyte recovery stems from the elimination of metal interactions.

Figure 3:
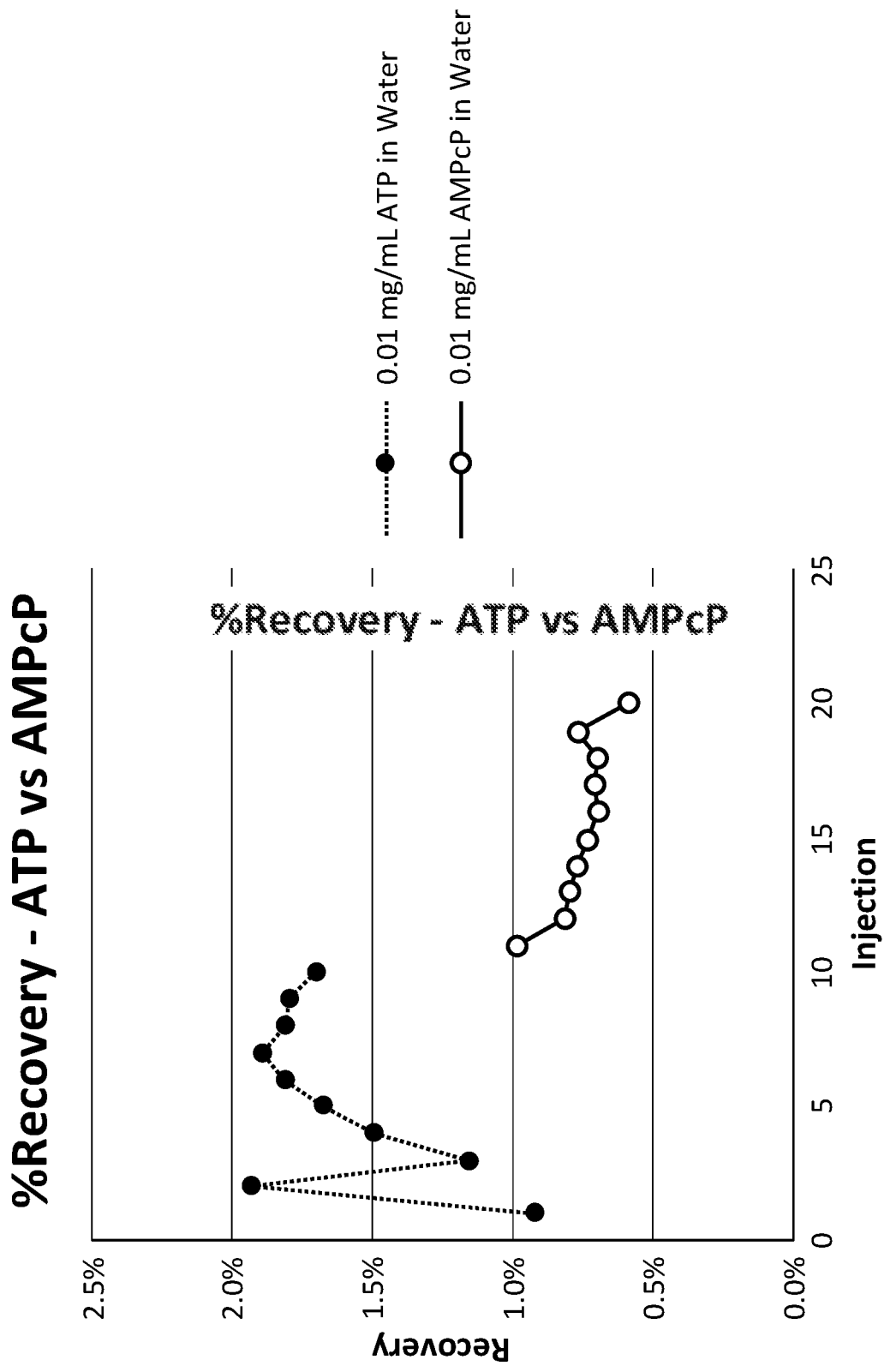
FIG. 3 is a representative example demonstrating an evaluation test for metal sensitivity of probe compounds without reliance on chromatography, in accordance with an illustrative embodiment of the present disclosure.

FIG. 3 is a representative example demonstrating an evaluation test for metal sensitivity of probe compounds without reliance on chromatography, in accordance with an illustrative embodiment of the present disclosure. The extent to which probe compounds (e.g., chemically synthesized compounds) interact with exposed metal in chromatographic systems and columns can be used to design and execute suitability experiments which yield helpful information to an analyst. Overly interacting compounds may yield zero detectable signal, whereas minimally interacting compounds could fail to detect exposed metal in the system and/or column. For this reason, an injection test which utilizes a chromatographic system with an inert flow path (with the exception of single component, e.g., the column) with exposed metal was developed, as described in Example 3. This evaluation enables a set of compounds to be characterized for the extent to which they adsorb to the metal component (e.g., active preheater or a metallic frit placed inline) and compared. FIG. 3 displays a comparison of different positive controls (ATP vs. AMPcP) interaction and adsorption to a metal component.

As seen in FIG. 3, the area recovery (%) of probe compounds AMPcP and ATP are measured and compared. This approach enables the evaluation of probe compounds for their tendency to bind to exposed metal relative to each other under the tested conditions. Furthermore, the test can be modulated by using components with more or less exposed metal in the flow path.

FIG. 3 demonstrates the ability to measure the area recovery (%) of probe compounds, here AMPcP and ATP, through an injection test with a titanium (Ti) frit inline. In FIG. 3, the test conditions include a 10 ng injection and a solvent of 10 mM Ammonium Acetate. The flow rate was set to 0.2 mL/min, and the Ti frit was an uncoated 4.6 mm Ti frit. The concentration of both probe compounds, AMPcP and ATP, 0.01 mg/mL in water. Recoveries for the test probe compounds can be compared at equivalent molar loads to evaluate their tendency to bind exposed metal relative to each other under the tested conditions.

Beyond the described approaches for designing and synthesizing probe compounds for the detection of exposed metal in liquid chromatographs, chromatographic columns and coupled detectors, manufacturing approaches and considerations are described. Because the magnitude of the impact of secondary interactions between the various described metal-sensitive compounds and metallic surfaces on chromatographic performance are molecular load dependent, it follows that methodological approaches intending to measure the degree of exposed metal control the molecular load of the test probes. Some of the probe compounds previously described are purified or sourced in a composition, which is not entirely comprised of the probe compound. Specifically, it is common for the desired compound to crystallize with counterions and/or water. The amount of counterion and/or water varies from lot to lot of sourced or purified material.

Additionally, hygroscopic reagents absorb water content from the atmosphere, altering the water content (e.g., mass % water in reagent solid material) from the initially measured amount. Preparation of a test sample (e.g., a suitability sample including a positive control only or both the positive and negative control) without accounting for this variability will lead to variable test concentration of the metal sensitive compound and complicate system suitability testing results and analysis.

These challenges can be addressed through the preparation of standards where the chemical components are prepared in stock solutions, which account for the presence of counterions and/or water in the bulk material, aliquoted in controlled volumes and lyophilized into individual vials. Additionally, for the purposes of chemical stability and for producing a visible solid pellet in the standard vials, a stabilizing compound can be added, such as trehalose. It is important that the stabilizing compound not interfere with the intended system suitability tests, meaning the compound should exhibit little to no UV, fluorescence or MS signal as well as minimal to no MS suppression. Manufacturing system suitability standards in this way increases the consistency of the test sample concentration, increasing the reliability and robustness of the system suitability techniques which employ these standards.

A kit for evaluating system inertness can be used in conjunction with these stock solutions. For example, the kit can include a container to hold a solution where the solution includes a positive control comprising a metal interacting moiety; and a negative control that does not contain a metal interacting moiety.

Figure 4:
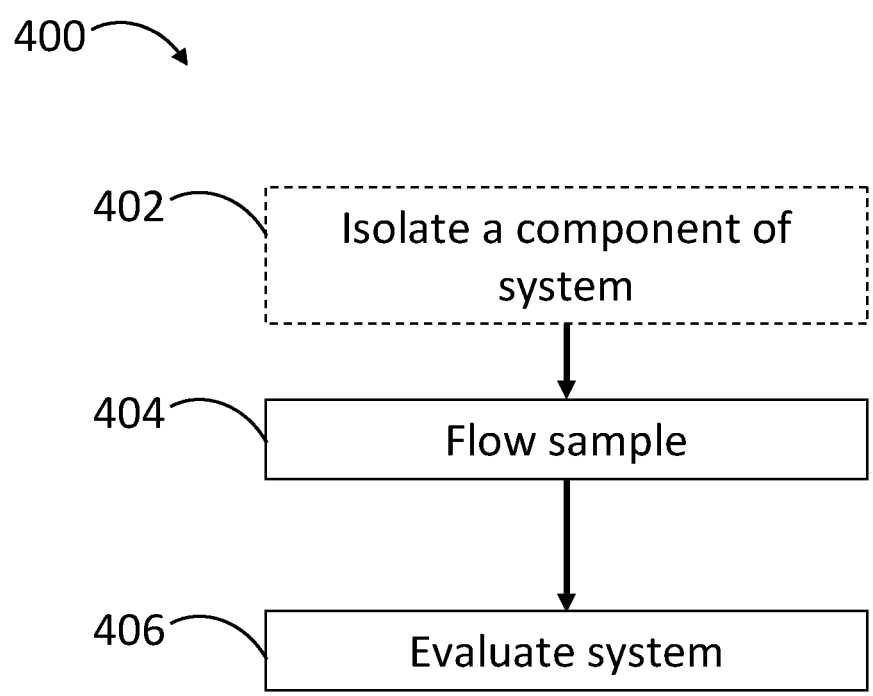
FIG. 4 is a flow chart showing a method of evaluating system suitability, in accordance with an illustrative embodiment of the present disclosure.

FIG. 4 is a flow chart showing a method 400 of evaluating system suitability, in accordance with an illustrative embodiment of the present disclosure. The method has certain steps, which are optional as indicated by the dashed outline surrounding a particular step. Method 400 can start with isolating a component of the system 402. It may be desired to only test a portion of the LC system at a given time. Only a portion of the LC system may need to be tested at a given time. When a component of the LC system (e.g., sample injector) is replaced, the component may be evaluated. Evaluating only a portion of the system (e.g., only a component of the system) may be useful for troubleshooting the system.

As indicated, isolating a component of the system 402 is optional. In some examples, the whole system/device will need to be evaluated for suitability. A suitability sample can be flowed 404 through a system, e.g., system/device 100. The suitability sample can contain one compound or several compounds. After the sample flows through the system, a chromatography detector can be used to evaluate the suitability sample and consequently whether the components of the flow path are inert.

During or after flowing suitability sample 404, method 400 includes evaluating the system 406. There are a number of approaches which can be employed individually or in combination to address the presence of secondary interactions and their impact on the quality of a given chromatographic separation. Inert system characterization approaches are necessary for evaluating proper function of the inert surfaces.

In some embodiments, the system suitability analysis is performed simultaneously with an injection of both a sensitive probe that interacts with the surface (positive control) and a non-interacting (negative control) probe. Peak area ratios can thus be compared to confirm system suitability. If the ratio of the positive control to the negative control is sufficiently high, the system is deemed to have good system health and to be suitable for performing analyses.

Figure 5:
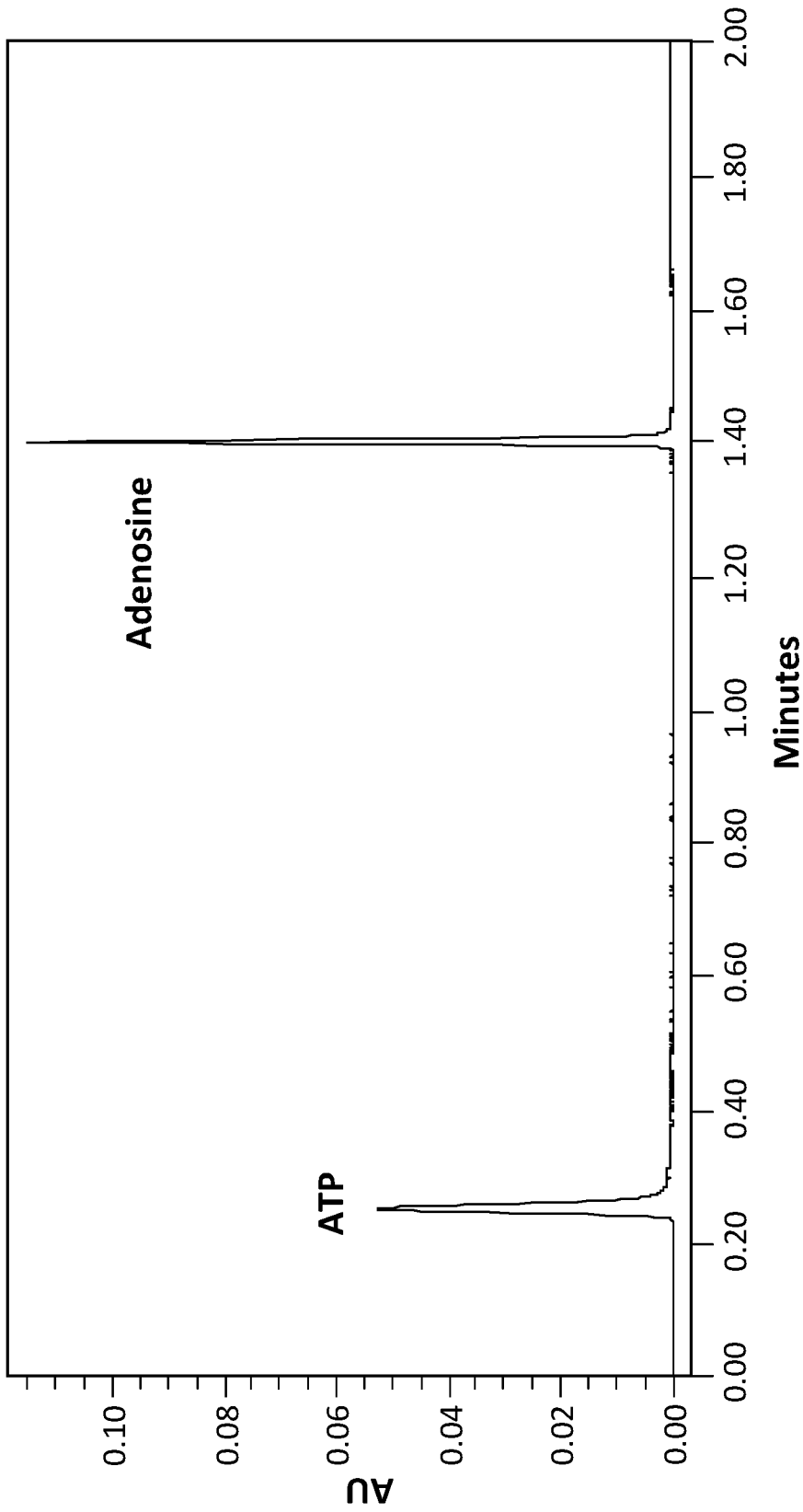
FIG. 5 is a representative example demonstrating a chromatographic test for inert surfaces with a metal-sensitive compound and inert analog, in accordance with an illustrative embodiment of the present disclosure.

FIG. 5 is a representative chromatographic example demonstrating a chromatographic test for inert surfaces with a metal-sensitive compound and inert analog, in accordance with an illustrative embodiment of the present disclosure. Specifically, FIG. 5 displays a representative chromatographic example demonstrating the ability to readily resolve ATP (positive control probe) and adenosine (negative control probe) by reversed phase chromatography. Comparison of peak area ratios, peak area reproducibility, peak shape and peak shape reproducibility allows for characterizing the liquid chromatograph and chromatographic column's surface inertness and suitability for use in applications. The comparison will use one or more compounds known to bind metals to measure surface inertness and suitability. As demonstrated in Example 1 (described below) and displayed in FIG. 5, the relative areas between ATP and adenosine can be used to evaluate the extent of metal interaction in the system while accounting for non-secondary interaction variation (e.g. injection volume) at the same time. Furthermore, evaluation of the peak shape of the ATP compound can be used to characterize system suitability.

In some examples, a method of characterizing a system includes introducing a sample with a positive control and a negative control to the system (e.g., a suitability sample). The positive control is a sensitive probe that interacts with the system and the negative control is substantially non-interacting with the system. In some examples, a compound that is substantially non-interacting with the system can be defined as a compound that does not contain a metal interacting moiety or molecules without one or more strongly electronegative moieties, such as acidic residues with pKas lower than 5. The method can further include detecting the positive control and the negative control and determining system suitability by comparing the amount of detected positive control to negative control.

Determining system suitability by comparing the amount of detected positive control to negative control can include determining a ratio of detected positive control to negative control. If the ratio of the positive control to the negative control is sufficiently high, the system is deemed to have good system health and be suitable for performing analyses. In some examples, sufficiently high is greater than 0.5, 0.6, 0.7, 0.8 0.9 or less than 1.1, where a ratio of 1.0 indicates no loss of analyte to system flow path interactions. What is considered to be sufficiently high can vary based on the negative and positive controls that are selected. For example, positive controls that interact strongly with exposed metal (e.g., ATP or AMPcP) can have a lower end of the range of the ratio be 0.75 or 0.8.

In some examples, an analyst may adjust the system in order to target a ratio of 1.0, and an analyst can determine the lower range of acceptable values for the ratio based on the needs of the analyst/system. Determining system suitability by comparing the amount of detected positive control to negative control includes determining the inertness of the system to the positive control and/or indicates integrity of an inert coating deposited along a flow path of the system.

Determining system suitability can include testing one component of the system, e.g., a sample injector. The sample could detrimentally affect other components. Only a portion of the LC system may need to be tested at a given time. For example, evaluating only a portion of the system may be useful for troubleshooting the system.

Detecting the positive control and the negative control can use a detector configuration of liquid chromatography-optical, liquid chromatography-mass spectrometry, liquid chromatography-optical-mass spectrometry, where optical represents an ultraviolet/visible (UV/Vis) absorbance or a fluorescence detector. The flow of the suitability sample can also be split.

More than one chromatographic approach can be used to evaluate the system. The more than one chromatographic approach to evaluate the system can be completed simultaneously. For example, employing more than one chromatographic approach includes introducing a sample (i.e., a suitability sample) with multiple chemical compounds. The multiple chemical compounds include the negative control, the positive control, and a mixture of resolved neutrals. For example, the compounds can include a paraben or phenone ladder in addition to the positive and negative controls as surface probes. An example of a paraben ladder can include at least one of methylparaben, ethylparaben, propylparaben, or butylparaben. An example of a phenone ladder can include at least one or more of acetophenone, propiophenone, butylparaben, benzophenone, or valerophenone. The intentional variation of hydrophobicity helps ensure successful resolution by reversed-phase chromatography. In addition, well-characterized neutral compounds, such as 2-acetylfuran, caffeine, or acetanilide, can be used in a similar fashion. Selection is based on, at least in part, differences in hydrophobicity that can lead to a compound set which will well resolve and enable assessment of performance aspects including gradient delivery, flow rate accuracy as well as column efficiency and health. The method can include evaluating gradient delivery and exposed metal surfaces in a single injection.

Characterizing the system can be a previously determined maintenance step of the system. For example, the maintenance step can be scheduled after a previously determined number of uses or previously determined amount of time. In other embodiments, characterizing the system can occur before a long or extremely long separation or run (e.g., day or multiple day run) to ensure suitability prior to initiating a long procedure. In certain embodiments, characterizing the system can occur before separation of an expensive or precious sample. In some embodiments, characterizing the system can occur before separation of a highly metal sensitive sample or sample/application prone to known system environment suitability issues.

In some examples, no chromatography column is used and repeat injections of the suitability sample (e.g., sample including a positive control probe) are flowed through the system and to the detector. If the detector indicates that the compound of the sample is increasing, it may be an indication that the system is not inert. For example, there may be exposed metal, and the sample is slowly passivating the exposed metal so that an increasing amount of suitability sample is detected after each injection.

When testing is done over repeat injections, it is diagnostic to look at consistency across the injections. A system that is functioning well would show consistent results across the injections for the sample detected. And these results should be reproducible. A system with exposed metal would show changes across the injections. And the number of injections used to evaluate system can vary based on the components of the system as well as the compounds of the sample. In some examples, there are at least 3 injections, 3-50 injections, 4-20 injections.

While the use of AMPcP to evaluate system inertness is a novel approach, AMPcP can also be used as part of a method to test performance of mechanical components of a system. In a scenario where only AMPcP is injected and the response is lower than expected, one would be left speculating at whether the result was due to metal interactions or due to mechanical aspects of the system. To distinguish the impact of metal interactions from other system performance problems, another reference check was implemented.

FIG. 6 displays an overlay of representative chromatograms of AMPcP (positive control probe) and caffeine (negative control probe) on an ethylene bridged HST LC system (top chromatogram, 602; AMPcP, 604; caffeine, 606) versus the same system where one part was swapped for an MP35N equivalent (bottom chromatogram, 608; AMPcP, 614; caffeine, 612). That is, FIG. 6 shows an overlay of injections of caffeine (606, 612) and AMPcP (604, 614) on an ethylene bridged HST LC system versus a partially inert system where one component (representing approximately ~40% of the flow path surface area) was replaced with an MP35N part (i.e., a part with exposed metal).

FIG. 6 displays how replicate injections of AMPcP and caffeine with a UHPLC partially configured with hybrid surface technology (HST) (versus fully configured) readily identified exposed metal surfaces through increased peak area relative standard deviation as well as a reduction in absolute recovery. Injections of caffeine were explored as part of the system suitability measurement. Caffeine was used as a negative control for metal binding. Caffeine is not predicted to interact with metal surfaces and can therefore give an instrument specific representation of peak shape and dispersion, and overall mechanical system performance.

The experimental protocol, for the results depicted in FIG. 6, included initial injections of 0.3% ammonium hydroxide to clean any metal surfaces, followed by multiple injections of AMPcP, and finally multiple injections of caffeine. The conditions included flow rate of 0.5 mL/min of 80:20 acetonitrile:water. AMPcP and caffeine replicates were analyzed after six replicate injections of 0.3% ammonium hydroxide (aq) and two minutes of equilibration with the stated mobile phase and flow rate.

A comparison of representative caffeine injections run on this fully versus partially inert system (FIG. 6, top chromatogram 602 as compared to bottom chromatogram 608) showed nearly identical peak area, peak height, and peak shape. The average values for peak area, peak height, and area RSD were 16100 µAU*sec, 32000 µAU, and 1.0%, respectively, on the fully inert system and average values for peak area, peak height, and area RSD were 16300 µAU*sec, 32800 µAU, and 1.0%, respectively, on the partially inert system. There is good agreement in values obtained on the two systems which confirms that caffeine does not undergo any significant interactions with metal. Additionally, this information confirms that both LC configurations were equivalently assembled and functioning properly. It is important to be able to distinguish between system inertness and mechanical performance. The addition of caffeine to a testing protocol allows for these observations to be decoupled.

In contrast to the caffeine results (606 and 612), AMPcP injections (604 and 614) proved to be significantly different when observed on the fully versus partially inert system. Average values for AMPcP peak area and peak heights were 18000 µAU*sec and 34400 µAU, respectively, with the fully inert system, whereas the same values were 12900 µAU*sec and 18100 µAU with the partially inert system. This corresponded to a 28% decrease in average peak area and an 47% decrease in average peak height. The AMPcP peak area relative standard deviation on the fully inert system was 0.4%, while the same measurement on the partially inert system increased to 4.3%.

The data presented above demonstrates an effective approach for determining both system inertness and system performance. The data collected above used an inert system where a single part was knowingly changed to a metal part. In some examples, this test can be used to determine the presence of unknown amounts of metal in a flowpath. Observations of repeatability (or lack thereof) are likely to be the most diagnostic of problems from metals. Moreover, a ratio of peak areas between AMPcP and caffeine might prove effective. In FIG. 6, the fully inert system showed a peak area ratio of 1.1 (as predicted), whereas the partially inert system showed a peak area ratio of only 0.79, indicating some of the metal-sensitive AMPcP had been lost to the flow path.

Figure 7A:
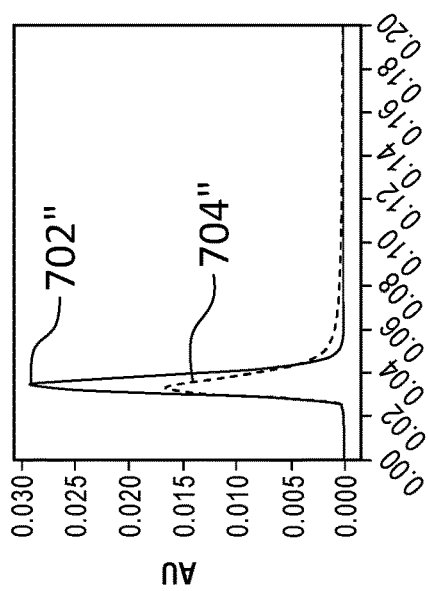
FIG. 7A is a chromatogram showing the caffeine peak and the AMPcP peak on a chromatographic system equipped with PEEK (no metal).
Figure 8A:
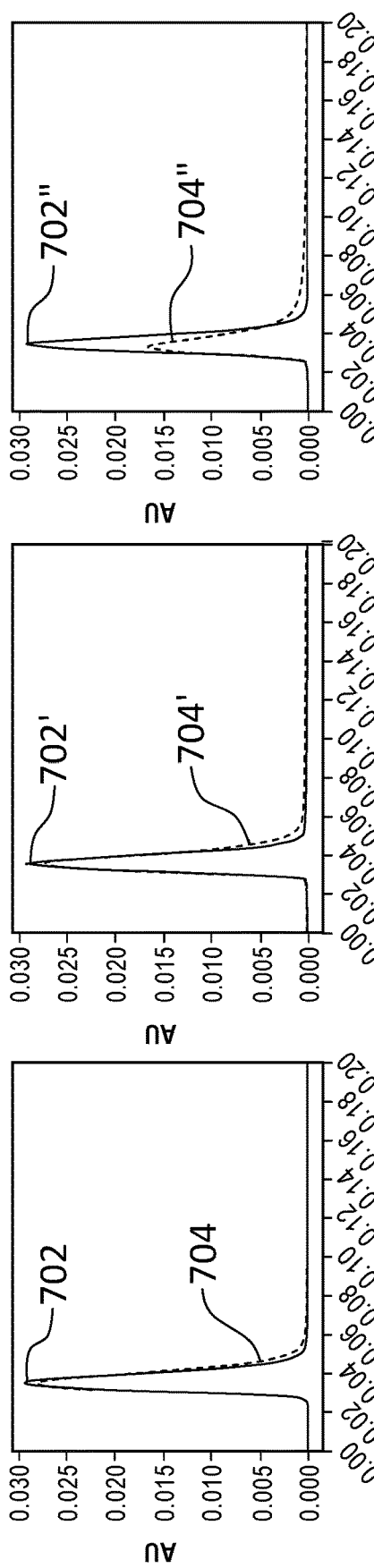
FIG. 8A is a chromatogram showing the caffeine peak and the AMPcP peak on a chromatographic system equipped with ethylene bridged hybrid coated chromatographic surfaces (inert material covering metal surfaces).
Figure 9A:
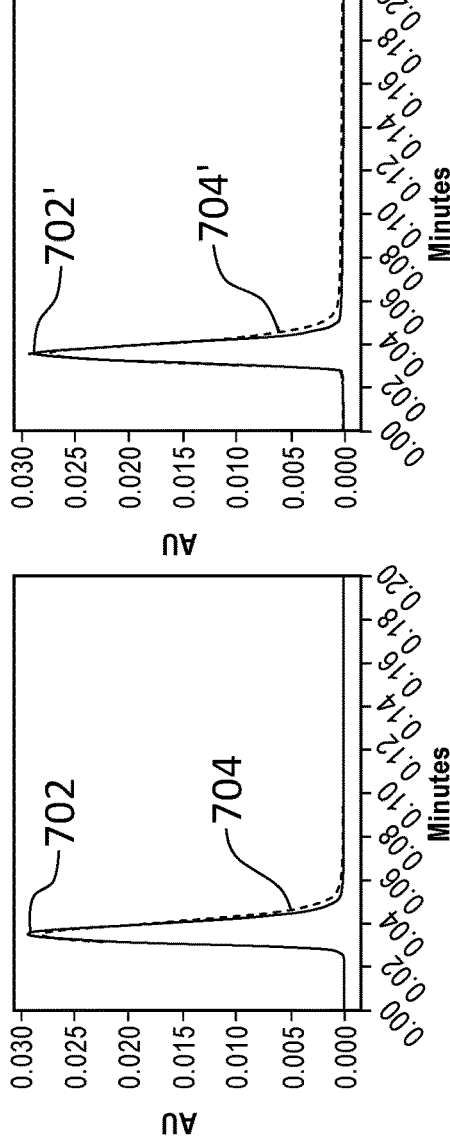
FIG. 9A is a chromatogram showing the caffeine peak and the AMPcP peak on a chromatographic system equipped with purposely degraded ethylene bridge hybrid coated chromatographic surface (metal exposure due to degradation of coating expected).

FIGS. 7A, 8A, and 9A provide chromatograms of caffeine versus AMPcP peaks for three different systems. The chromatographic system used to obtain the peaks of FIG. 7A was equipped with PEEK (an inert, non-metal containing system). The chromatographic system used to obtain the peaks of FIG. 8A was equipped with ethylene bridged hybrid coated chromatographic surfaces (a metal system made inert via an organosilica coating deposited on chromatographic surfaces. The chromatographic system used to obtain the peaks of FIG. 9A was equipped with a purposely degraded ethylene bridge hybrid chromatographic surface (a system with expected metal exposure due to the degradation of the coating). A quick visual comparison of FIGS. 7A, 8A, and 9A illustrate how using an embodiment of the system suitability solution (AMPcP and caffeine containing equimolar solution) is used to show suitability (peak shapes of equimolar positive and negative control probes) to be substantially similar as compared to unsuitable (peak shape of caffeine differing from that of AMPcP).

Figure 7B:
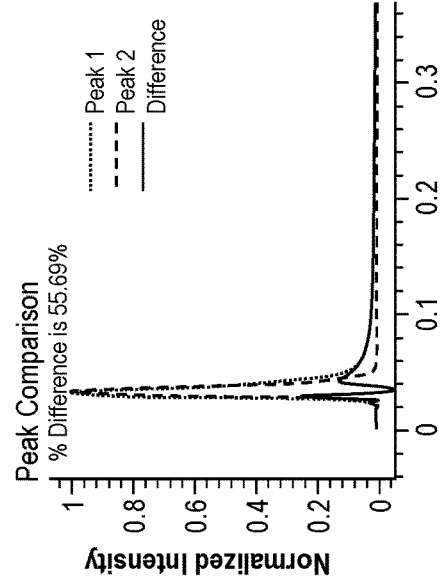
FIG. 7B displays a peak comparison tool for comparison of AMPcP and caffeine peak shapes provided in FIG. 7A.
Figure 8B:
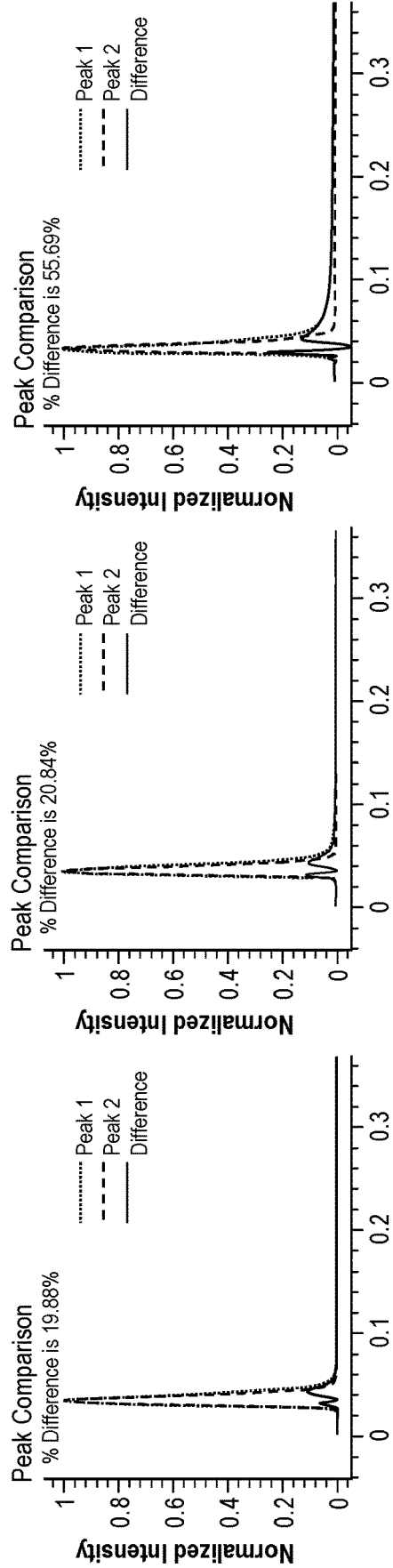
FIG. 8B displays a peak comparison tool for comparison of AMPcP and caffeine peak shapes provided in FIG. 8A.
Figure 9B:
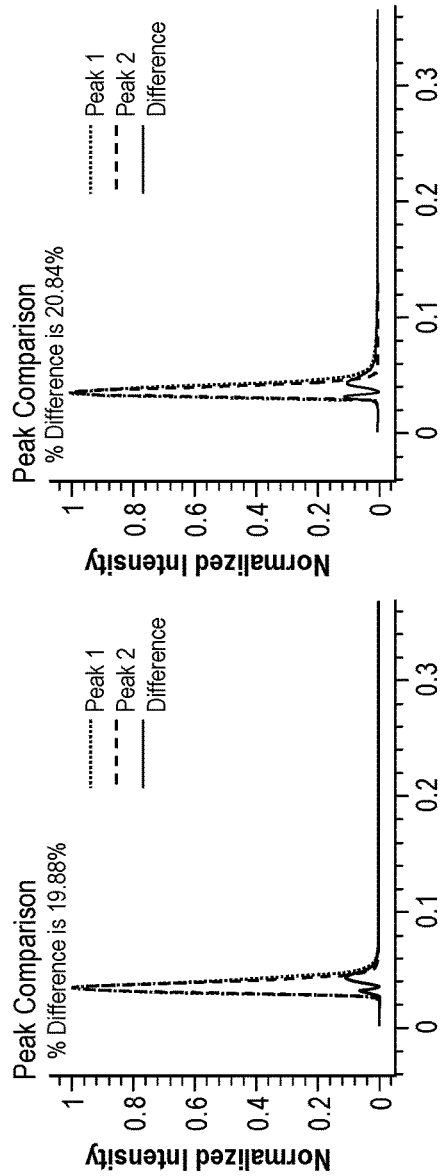
FIG. 9B displays a peak comparison tool for comparison of AMPcP and caffeine peak shapes provided in FIG. 9A.

While the mathematical calculations for repeatability and peak area ratio are useful for determining system inertness, one last type of data treatment was explored, namely a tool to compare the acquired caffeine and AMPcP chromatograms, output a difference plot and also quantify the percent difference between the traces. The peak visualizer tool was designed to take the chromatograms for caffeine and AMPcP (i.e., those shown in FIGS. 7A, 8A, and 9A) and normalize their peak heights before plotting differences in intensity across the collected data points (FIGS. 7B, 8B, and 9B). The peak heights are normalized to account for any potential differences in sample preparation. The peak visualizer tool therefore identifies meaningful differences in peak shape and tailing between the two chromatograms. For a fully inert system, the comparison of the caffeine and AMPcP peaks should give an overall low level of difference since the peak shape would only be based on system dispersion effects. If, however, the system contains some amount of exposed metal in the flowpath, the difference in the caffeine peak shapes (702, 702', and 702") and AMPcP peak shapes (704, 704', and 704") would be predicted to be more significant.

Example flow injection tests were processed using the prototype peak visualizer tool for an all PEEK flowpath (FIG. 7B) compared to an inert ethylene bridged coated surfaces (FIG. 8B) and difference values of 19.88 and 20.84% were determined. Both are low level differences and both are within the same range of difference (i.e., within 1% from each other). Meanwhile, a % difference value of 55.69% was determined for flow injection results from a chromatographic system including ethylene bridged coated surfaces wherein a single component had been purposely and aggressively degraded by exposure to 96 L of aqueous at pH 10 and 90° C. conditions over 57 days (FIG. 9B). The significant increase in % difference on the LC with the force degraded LC component demonstrates the usefulness of the peak visualization tool for determining the presence of metal within the chromatographic flow path. The ease with which this tool can be implemented makes it appealing to consider for this type of system readiness measurement.

EXAMPLES

For the reagents and standards of the examples, all reagents were acquired from Millipore-Sigma (Burlington, Mass.). LC-MS grade Acetonitrile was acquired from Honeywell (Muskegon, Mich.). Deionized water was produced using a Millipore Milli-Q system. The liquid chromatography system, including the chromatography columns, has been treated by the above described vapor deposition of organosilica to attenuate metal interactions. Example 1 employs UV detection.

Example 1

Reversed Phase LC-UV with Detection of Adenosine-5'-Triphosphate (ATP) and Adenosine Example 1 is a technique for evaluating surface metal exposure that involves the separation and measurement of ATP/adenosine through a chromatographic column. The adenosine acts as a negative control, where non-metal interaction related impacts on the separation and recovery would be observed. For example, under-delivery of volume by the injector would result in reduced area for the metal-sensitive ATP as well as the adenosine control compound.

As demonstrated in Example 1 and displayed in FIG. 5, the relative areas between ATP and Adenosine can be used to evaluate the extent of metal interaction in the system while accounting for non-secondary interaction variation (e.g. injection volume) at the same time. Furthermore, evaluation of the peak shape of the ATP compound can be used to characterize system suitability.

A test sample (e.g., a suitability sample) comprised of 20 ng/µL ATP and 9.5 ng/µL Adenosine in water is prepared from 1 mg/mL stock solutions of ATP in water and Adenosine in water. These solutions are then diluted into a single sample vial to produce the test sample. Due to the anticipated degradation of ATP to ADP by hydrolysis, freshly prepared test samples are recommended for use. Similarly, the employed ammonium acetate mobile phases are also prepared fresh daily as the ammonium acetate buffer salt is known to be volatile.

The separation details are found in Table 1. Following the analysis of at least five injections of the test sample, the results can be evaluated for peak area, reproducibility and peak shape for ATP and Adenosine. Effective metal interaction attenuation is indicated by comparable peak areas for the two compounds, comparable and low peak area variability and comparable and low peak tailing.

TABLE 1

Separation details for Example 1

Test Conditions

| Column | ACQUITY PREMIER HSS T3 1.8 μm 2.1 × 50 mm (p/n 186009467) |
|---|---|
| Sample | 20 ng/μL ATP and 9.5 ng/μL Adenosine in water |

ACQUITY PREMIER Solvent Manager

| Solvent Line A | 10 mM ammonium acetate, pH 6.8 in 99.8:0.2 water/acetonitrile |
|---|---|
| Solvent Line B | 8 mM ammonium acetate in 79.8:20.2 water/acetonitrile |
| Purge Solvent | Mobile phase A |
| Wash Solvent | 50:50 Water:Acetonitrile |
| Seal Wash Solvent | 50:50 Water:Acetonitrile |
| Diluent | Water |
| Flow Rate | 0.5 mL/min |

| Gradient: | Time | %A | %B | Curve |
|---|---|---|---|---|
| | 0.0 | 95 | 5 | Initial |
| | 0.2 | 95 | 5 | 6 |
| | 0.8 | 5 | 95 | 11 |
| | 0.9 | 5 | 95 | 11 |
| | 1.0 | 95 | 5 | 11 |
| | 2.0 | 95 | 5 | 11 |

ACQUITY PREMIER FTN

| Sample Temperature | 20° C. |
|---|---|
| Column Heater Set Temperature | 35° C., APH Enabled |
| Pre-Inject | 0 sec |
| Post-Inject | 6 sec |
| Needle Placement (from bottom) | 3 mm |
| | * make sure that the needle's Z-axis position is properly calibrated. |

ACQUITY TUV/PDA Channel A

| Detector Inlet Tubing (CH-A and CM-A) | 0.0025 in. ID |
|---|---|
| Detector Inlet Tubing (CH-30A) | 22.5″ HPS MP35N welded tube |
| Wavelength: Bandspreading | 260 nm |
| Filter | None |
| Sampling rate | 40 points per second |

Example 2

Reversed Phase LC-UV with Detection of Adenosine 5'-(α, β-Methylene)Diphosphate (AMPcP) and Adenosine Example 2 is a technique for evaluating surface metal exposure that involves the separation and measurement of AMPcP and Adenosine using a chromatographic column. The Adenosine acts as a negative control, where non-metal interaction related impacts on the separation and recovery would be observed. For example, under-delivery of volume by the injector would result in reduced area for the metal-sensitive AMPcP as well as the Adenosine control compound.

A test sample comprised of 17 ng/μL AMPcP and 10.7 ng/μL Adenosine in water is prepared from 1 mg/mL stock solutions of AMPcP in water and Adenosine in water. These solutions are then diluted into a single sample vial to produce the test sample. Ammonium acetate mobile phases are to be prepared fresh daily as the ammonium acetate buffer salt is known to be volatile.

The separation details are found in Table 2. Following the analysis of at least five injections of the test sample, the results can be evaluated for peak area, reproducibility and peak shape for AMPcP and Adenosine. Effective metal interaction attenuation is indicated by comparable peak areas for the two compounds, comparable and low peak area variability and comparable and low peak tailing.

TABLE 2

Separation details for Example 2

Test Conditions

| Column | ACQUITY PREMIER HSS T3 1.8 μm 2.1 × 50 mm (p/n 186009467) |
|---|---|
| Sample | 17.0 ng/μL AMPcP and 10.7 ng/μL Adenosine in water |

ACQUITY PREMIER Solvent Manager

| Solvent Line A | 10 mM ammonium acetate, pH 6.8 in 99.8:0.2 water/acetonitrile |
|---|---|

TABLE 2-continued

| Separation details for Example 2 | |
| --- | --- |
| Solvent Line B | 8 mM ammonium acetate in 79.8:20.2 water/acetonitrile |
| Purge Solvent | Mobile phase A |
| Wash Solvent | 50:50 Water:Acetonitrile |
| Seal Wash Solvent | 50:50 Water:Acetonitrile |
| Diluent | Water |
| Flow Rate | 0.5 mL/min |

| Gradient: | Time | %A | %B | Curve |
| --- | --- | --- | --- | --- |
| | 0.0 | 95 | 5 | Initial |
| | 0.2 | 95 | 5 | 6 |
| | 0.8 | 5 | 95 | 11 |
| | 0.9 | 5 | 95 | 11 |
| | 1.0 | 95 | 5 | 11 |
| | 2.0 | 95 | 5 | 11 |

ACQUITY PREMIER FTN

| | |
| --- | --- |
| Sample Temperature | 20° C. |
| Column Heater Set Temperature | 35° C., APH Enabled |
| Pre-Inject | 0 sec |
| Post-Inject | 6 sec |
| Needle Placement (from bottom) | 3 mm |
| | * make sure that the needle's Z-axis position is properly calibrated. |

ACQUITY TUV/PDA Channel A

| | |
| --- | --- |
| Detector Inlet Tubing (CH-A and ΩM-A) | 0.0025 in. ID |
| Detector Inlet Tubing (CH-30A) | 22.5" HPS MP35N welded tube |
| Wavelength: Bandspreading | 260 nm |
| Filter | None |
| Sampling rate | 40 points per second |

Example 3

Controlled Metal Exposure Test for Evaluating Positive Probe Compounds

Example 3 is an example of a technique for evaluating the capability of compounds to detect controlled levels of exposed metal in chromatographic systems. The method details are found in Table 3. Following the analysis of at least five injections of the test sample, the results can be evaluated for peak area and reproducibility for the probe compound. Comparison of results to other probe compounds analyzed under the same conditions provide an understanding of the compounds ability to detect exposed metal.

TABLE 3

| Separation details for Example 3 | |
| --- | --- |
| System: | System: ACQUITY UPLC ® I-Class [Consisting of a BSM with 50 µL Mixer, TUV Detector (Flow cell: Analytical, 500 nL), SM-FL with PEEK needle, 10 µL loop, and CH-A heater] [Post-column tubing to TUV: 0.0025" ID PEEK, 8.5" Length], with $C_2$ vapor deposition coated LC flow path components and loop. LC flow path components will consist of a PEEK needle, $C_2$ vapor deposition coated active preheater assembly, loop and needle seat port. |
| Data Acquisition and Analysis: | Empower 3, Feature Release 4 (FR4) |
| Column: | 4.6 mm Ti frit - 289012229, installed into the flow path with 999047745 and 405023485 - no column |
| Column Temperature: | 30° C. APH enabled |
| Seal Wash: | 90% 18.2 MΩ water/10% Methanol v/v (Seal Wash interval set to 5 min) |
| Sample Manager Wash and Purge Solvent | 90% 18.2 MΩ water/10% Methanol v/v (Seal Wash interval set to 5 min) |
| Solvent Line A: | 10 mM Ammonium Acetate pH 6.8 |
| Flow Rate: | 0.2 mL/min |
| Run Time: | 1 minute |
| Sample Temp. | 4° C. |
| Samples: | AMPcP dissolved in water at 4.25 ng/µL ATP dissolved in water at 4.25 ng/µL |

TABLE 3-continued

| Separation details for Example 3 | |
|---|---|
| Sample Injection Volume: | 1.0 µL |
| Blank: | 18.2 MΩ water |
| Blank Injection Volume: | 1.0 µL |
| Syringe Draw Rate: | Automatic |
| Needle Placement: | 3.0 mm (from bottom) |
| Air Gaps: | Automatic |
| Data Channels: | System Pressure |
| UV Wavelength: | 260 nm |
| TUV Sampling Rate | 20 points/sec |
| Filter Time Constant | Normal |
| Data Mode | Absorbance |
| Autozero On Inject Start | Yes |
| Autozero On Wavelength | Maintain Baseline |

The above aspects and features of the present disclosure provide numerous advantages over the existing technology. In some embodiments, there are numerous benefits for using the compounds of the present disclosure in system suitability testing of inert LC systems and columns. For example, the present disclosure uses probe compounds for the detection of exposed metal in liquid chromatographs, chromatographic columns and coupled detectors. These compounds (e.g., suitability samples) can help an analyst determine the suitability of a system for a particular application prior to (and without) expending resources (e.g., time and money) on separations that will not provide meaningful results. This information can prevent wasted resources of time and expense as knowledge of the suitability of the system for a particular application will eliminate or greatly reduce experiments destined to give poor quality results.

What is claimed is:

1. A kit for evaluating liquid chromatography (LC) system and column inertness, the kit comprising:

a first vial comprising a positive control comprising a metal interacting moiety, wherein the positive control is selected from the group consisting of 2'(3')-O-(4-Benzoylbenzoyl) adenosine 5'- triphosphate (Bz-ATP), ATP labeled with 6-aminohexyladenosine, ATP labeled with methylanthraniloyl, ATP labeled with trinitrophenyl, ATP labeled with fluorescein, and ATP labeled with pyrene; and a second vial comprising a negative control comprising caffeine, the negative control not containing a metal interacting moiety, wherein both the positive control

SEQUENCE LISTING

```
<160> NUMBER OF SEQ ID NOS: 2

<210> SEQ ID NO 1
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: Phosphothreonine
<220> FEATURE:
<221> NAME/KEY: MOD_RES
<222> LOCATION: (8)..(8)
<223> OTHER INFORMATION: Phosphothreonine

<400> SEQUENCE: 1

Gly Glu Gly Trp Gly Thr Gly Thr Gly Lys
1               5                   10

<210> SEQ ID NO 2
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Gly Glu Gly Trp Gly Thr Gly Thr Gly Lys
1               5                   10
``` and the negative control are used as probe compounds for the detection of exposed metal in LC system and column.

2. A kit for evaluating liquid chromatography (LC) system and column inertness, the kit comprising:
 a first vial comprising a positive control comprising a metal interacting moiety, wherein the positive control is ATP or a chemical analog thereof; and
 a second vial comprising a negative control comprising adenosine, the negative control not containing a metal interacting moiety, wherein both the positive control and the negative control are used as probe compounds for the detection of exposed metal in LC system and column.

3. The kit of claim 1, wherein the positive control consists of Bz-ATP.

4. The kit of claim 2, wherein the first vial and the second vial comprise equimolar amounts of the positive control and the negative control, respectively.

5. A kit for evaluating liquid chromatography (LC) system and column inertness, the kit comprising:
 a positive control comprising a metal interacting moiety, wherein the positive control is adenosine 5'-(α, β-methylene) diphosphate (AMPcP) or a chemical analog thereof;
 a negative control comprising adenosine or caffeine and that does not contain a metal interacting moiety, wherein both the positive control and the negative control are used as probe compounds for the detection of exposed metal in LC system and column; and
 a container to hold a system suitability solution.

6. The kit of claim 5, wherein the negative control consists of adenosine or substantially adenosine.

7. The kit of claim 5, wherein the negative control consists of caffeine or substantially caffeine.

8. The kit of claim 5, wherein the system suitability solution comprises an equimolar mixture of the negative control and the positive control.

9. The kit of claim 2, wherein the positive control comprises a chemical analog of ATP, and the chemical analog of ATP is 2'(3')-O-(4-Benzoylbenzoyl) adenosine 5'-triphosphate (Bz-ATP).

10. The kit of claim 2, wherein the positive control comprises a chemical analog of ATP, and the chemical analog of ATP is etheno adenosine 5'-(α,β- methylene) diphosphate with the following structure:

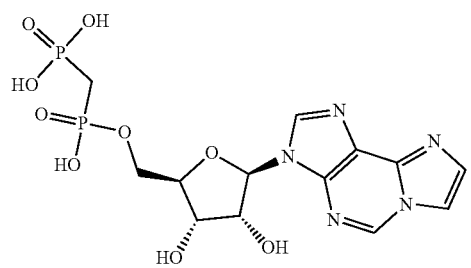

11. The kit of claim 2, wherein the positive control comprises a chemical analog of ATP, and the chemical analog of ATP is 6-aminohexyladenosine.

12. The kit of claim 2, wherein the positive control comprises a chemical analog of ATP, and the chemical analog of ATP is 2-aminopurine.

13. The kit of claim 2, wherein the positive control comprises a chemical analog of ATP, and the chemical analog of ATP is ATP labeled with methylanthraniloyl.

14. The kit of claim 2, wherein the positive control comprises a chemical analog of ATP, and the chemical analog of ATP is ATP labeled with trinitrophenyl.

15. The kit of claim 2, wherein the positive control comprises a chemical analog of ATP, and the chemical analog of ATP is ATP labeled with fluoroscein.

16. The kit of claim 2, wherein the positive control comprises a chemical analog of ATP, and the chemical analog of ATP is ATP labeled with pyrene.

17. The kit of claim 2, wherein the negative control and the positive control have different spectral properties.

18. A kit for evaluating liquid chromatography (LC) system and column inertness, the kit comprising:
 a first vial comprising a positive control comprising a metal interacting moiety, wherein the positive control is etheno adenosine 5'-(α,β-methylene) diphosphate or ATP labeled with 2-aminopurine; and
 a second vial comprising a negative control comprising caffeine, the negative control not containing a metal interacting moiety, wherein both the positive control and the negative control are used as probe compounds for the detection of exposed metal in LC system and column.

* * * * *